July 17, 1923.

A. F. KELLY 1,461,912

VEHICLE WHEEL

Original Filed March 29, 1920    2 Sheets-Sheet 1

Inventor
Adelbert F. Kelly

By Paul & Paul
His Attorneys

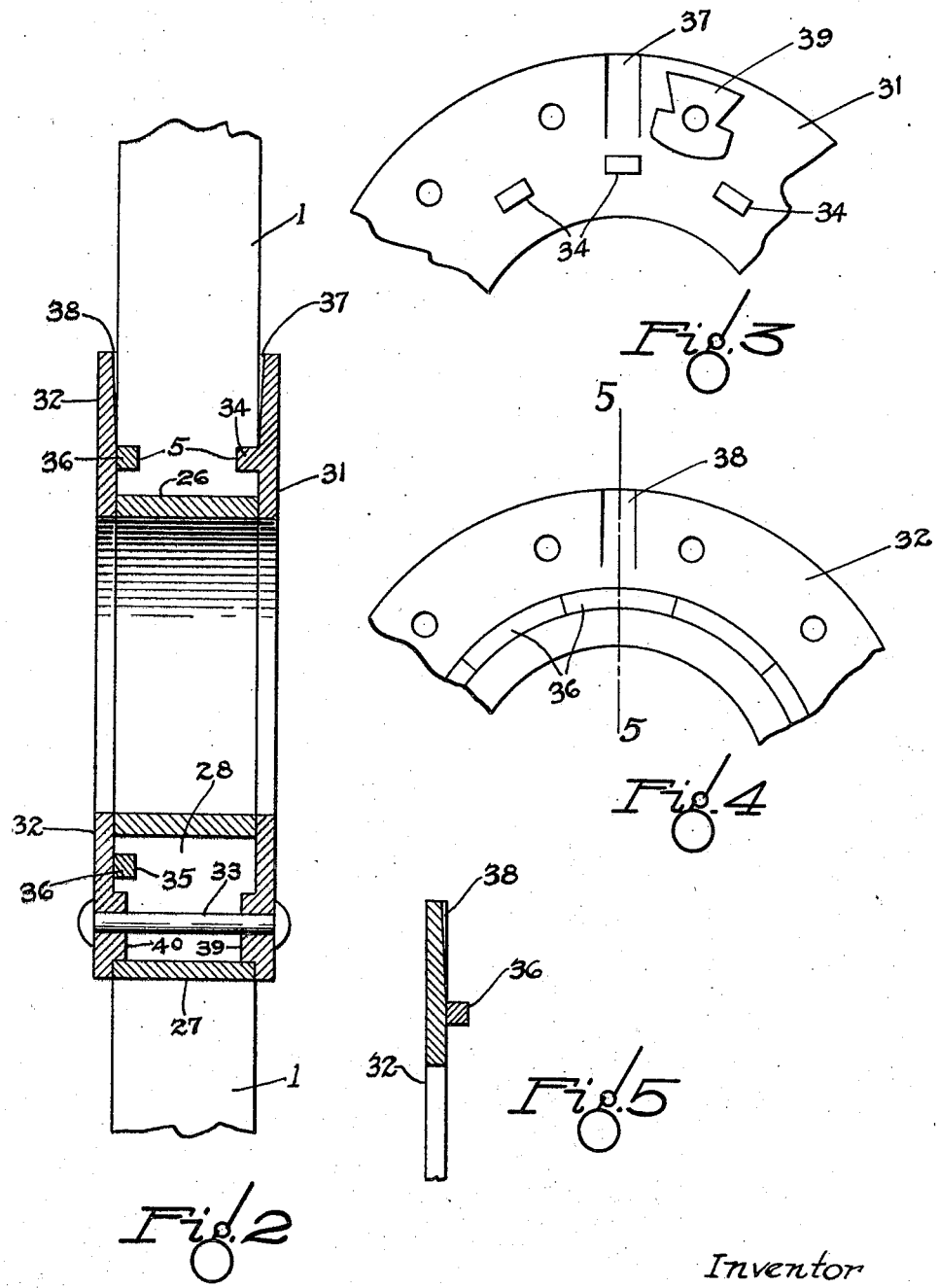

Patented July 17, 1923.

1,461,912

UNITED STATES PATENT OFFICE.

ADELBERT F. KELLY, OF SPOKANE, WASHINGTON.

VEHICLE WHEEL.

Original application filed March 29, 1920, Serial No. 369,765. Divided and this application filed December 30, 1920. Serial No. 434,045.

*To all whom it may concern:*

Be it known that I, ADELBERT F. KELLY, a citizen of the United States, resident of Spokane, county of Spokane, State of Washington, have invented certain new and useful Improvements in Vehicle Wheels, of which the following is a specification.

This invention relates to improvements in spring-spoke wheels, and has particular relation to the hubs used in motor vehicle wheels employed in conjunction with such resilient wheels.

The subject-matter of this present application has been divided out of the present pending application of the inventor hereof, Serial No. 369,765, filed March 29, 1920.

The invention here shown broadly consists of a novel form of hub structure. It is substantially of what may be termed a skeleton formation providing recesses or sockets into which the spring spokes may be seated while side plates are provided for closing the open sides of the hub. Means are provided to coact with the spring spokes for holding the same in assembled operative position. An important feature of this invention is to provide resilient means adjacent the hub periphery yieldingly to resist distortion of the inner portions of the spoke members.

The object of this invention is to provide an improved spoke wheel.

Other objects of the invention will more fully appear from the following description and the accompanying drawings and will be pointed out in the annexed claims.

In the accompanying drawings there has been disclosed a structure designed to carry out the objects of the invention, but it is to be understood that the invention is not confined to the exact features shown as various changes may be made within the scope of the claims which follow.

In the drawings:

Figure 2 is a section on the line 2—2 of Figure 1;

Figure 3 is an inside view of the side plate shown on the right in Figure 2;

Figure 4 is an inside view of the side plate shown on the left in Figure 2;

Figure 5 is a sectional view on the line 5—5 of Figure 4.

Figure 1:
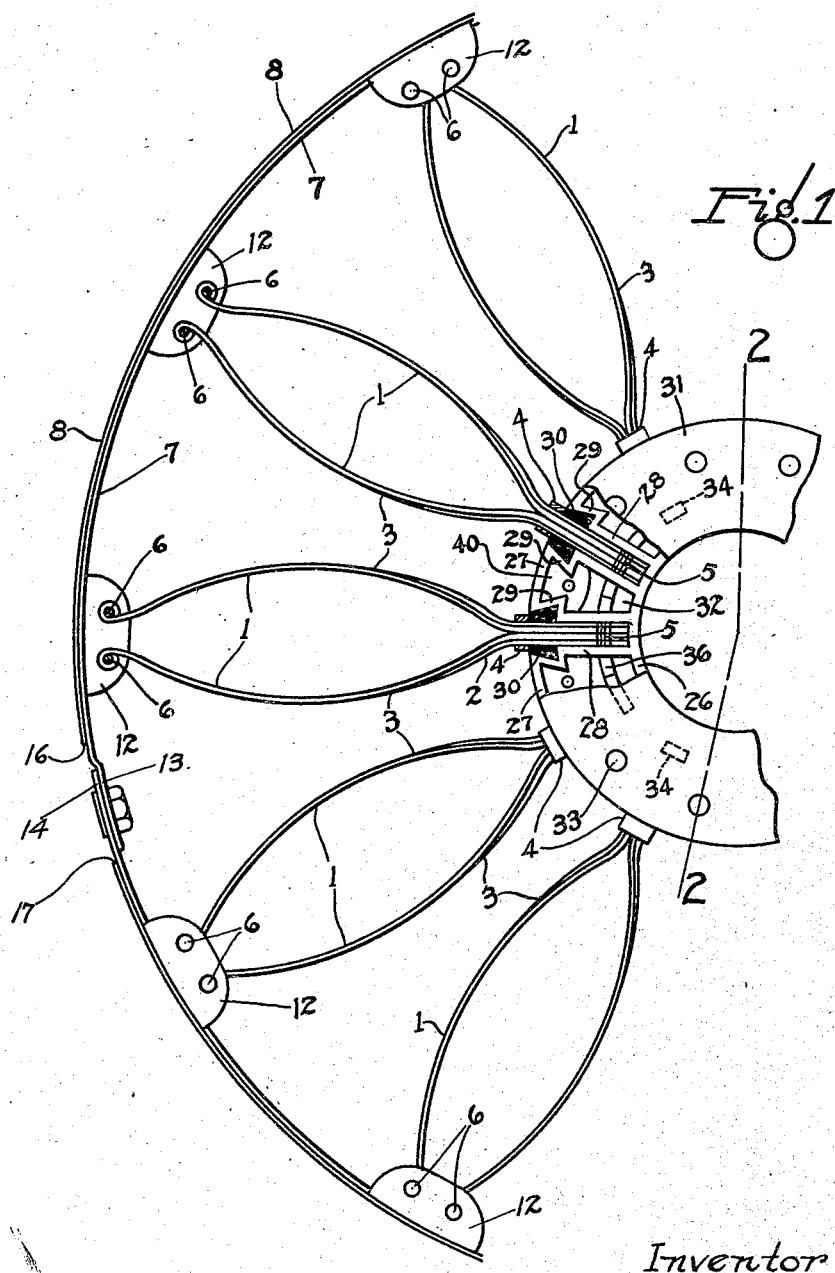
Figure 1 is a view in side elevation, with parts broken away, of the novel wheel.

In this selected embodiment of the invention there are provided a hub, spring spokes and rim. As the spring spokes here disclosed are not herein claimed as novel, they need only be described sufficiently to permit of an understanding of the construction. As here shown the spokes consist of bowed spring leaves 1 arranged in complementary pairs converging toward the hub and having substantially parallel portions inwardly extending. Each leaf 1 is provided with a relatively short supplementary reinforcing leaf 2. Each leaf 2 is shaped to be positioned against a spring leaf 1 and for that purpose is provided with a substantially straight hub portion and an outwardly extending curved portion which outwardly tapers to its end 3. A clip 4 serves to hold the assembled spring leaves 1 and co-operating reinforcing leaves 2 in assembled relation adjacent the hub. A novel means for holding the spring spokes in operative assembled relation to the hub is here provided and to that end the main and reinforcing leaves are provided with laterally alined notches 5. The outer ends of the main spring leaf 1 are preferably mounted upon rivets 6, carried by the rim.

The rim construction, which constitutes the subject-matter of and is claimed in the above-mentioned co-pending application of which the present is divisional, need only be briefly described. The rim consists of a spoke attaching section 7 and a reinforcing section 8 rigidly secured to each other in any suitable manner as, for example, by rivets. Portions of the inner section 7 are bent downwardly on opposite sides thereof to form oppositely disposed pairs of members 12 through which the rivets 6 extend whereby the outer ends of the spokes are held.

The improved hub structure includes inner and outer substantially cylindrical walls 26 and 27. The wall 26 is continuous while the outer or peripheral wall 27 is preferably separated into a plurality of segments in annularly spaced relation. Radial walls 28 extend from the inner wall 26 to the outer wall 27 and thereby form a skeleton hub open at the sides. These walls 28 form sockets into which the main leaves 1 and reinforcing leaves 2 are seated. The sockets are radially outwardly open through the spaces between adjacent segments comprising the outer or peripheral wall 27 and are thus annularly disposed in spaced relation about the hub.

The inner portions of the two walls 28 of each socket are substantially parallel, while the outer portions 29 thereof are offset in complementary pairs to provide seats of dovetail configuration into which may be disposed a resilient means tending to retain the straight portions of each spoke pair in normal adjacent parallelism. Preferably this resilient means consists of blocks of rubber or other material having similar properties. The rubber blocks 30, which are easily replaceable when worn, are inserted under pressure in the hub in order that they may effectually exert a constant force against opposite sides of the parallel portions of the spring spokes yieldingly to hold the latter centrally in the radially outer ends of the sockets. These blocks 30 perform an additional function in that they present relatively elongated radial faces against those portions of the spring leaves which are normally subjected to the sharpest or shortest bending and breaking stresses. Due to the resiliency of the blocks, the spoke inner portions may slightly yield in response to bending stresses so that the bending stresses are distributed over a longer portion of the spokes.

Means are provided for closing the open sides of this skeleton hub. Such means preferably consist of side plates 31 and 32 which are preferably in the form of flat-sided rings. These side plates are preferably secured to each other, as by means of rivets 33 inserted through alined holes in the complementary side plates. The side plate 31 is provided with lugs 34, preferably integral therewith, which enter between the socket walls 28 and project into the notches 5 of the spring spokes and thereby hold the spring spokes in assembled relation to the hub.

The spring spokes also have notches 5 on their sides opposite to that shown in Figure 1 and the walls 28 are notched in annular arcuate alinement therewith as indicated at 35. Sectors 36 are adapted to be seated in notches 5 and 35.

The plate 32 presents a plane inner face and when in assembled position functions to hold the sectors 36 in their seats. This plate 32 is on the inside of the wheel where it is not possible to encroach on the space necessary for the usual brake-band and drum. Therefore, the difference in construction of the two side plates, so far as the integral lugs 34 and the sectors 36 are concerned, avoids the necessity of removing both sides of the hub for replacement or repair of the spokes. This construction also provides for complete annular registry of the sectors 36 with the adjacently presented notches 5 of the spokes and notches 35 of the walls 28, so that only the lugs 34 need be individually fitted to the spokes and sockets. Thus, when removing a spoke it is merely necessary to take off plate 31 and by slightly spacing the hub from the plate 32, the sector 36 adjacent the spoke to be removed can be ejected from notches 5 and 35 without interfering with any of the remaining sectors.

As is indicated in Figures 2 and 5, the side plates are preferably cut away to provide outwardly tapering channels 37 and 38 to eliminate frictional engagement and contact of the spokes with the side plates when the spokes move within the limits permissible through the employment of the resilient blocks 30.

Bosses 39 and 40 are preferably integrally provided on the side plates 31 and 32. These bosses project inwardly from the inner face of the side plates and each is bored to permit passage therethrough of the rivets 33 whereby the side plates are secured to the skeleton hub. The bosses are similar and the configuration of each is shown in Figures 1 and 3. In Figure 1, it will be seen that each boss is shaped to fit about the walls 27 and 29. Therefore, when the sides 31 and 32 are bolted or riveted together, the plates will not only be held in place against axial or lateral release but will also be locked against radial and circumferential displacement with respect to the hub.

Having thus described my invention, what I claim as new and desire to secure by Letters Patent is:

1. A spring-spoke wheel hub structure including a hub presenting a plurality of sockets disposed thereon in annularly spaced relation, complementary pairs of opposedly bowed spring-spokes having inner portions extending inwardly through said sockets, means for securing the inner portions of each pair to said hub, and resilient means in each socket yieldingly to resist distortion of said spoke pairs.

2. A spring-spoke wheel hub structure including a skeleton hub comprising inner and peripheral cylindrical walls and radially disposed sets of walls extending from the inner to the peripheral wall to form spring-spoke sockets opening through the latter, spring-spokes adapted to be seated in said sockets, means to secure the spokes against axial and radial displacement, and resilient means adapted to be carried in said sockets between the spokes and the socket walls.

3. A spring-spoke wheel hub structure including a skeleton hub comprising inner and peripheral cylindrical walls and radially disposed pairs of walls extending from the inner to the peripheral wall, the inner portions of each pair of radial walls being formed in adjacent parallelism to form a constricted channel and the outer portions of each pair being spaced apart to form a peripheral sicket opening through said peripheral wall, complementary pairs of oppositely bowed spring-spokes, the inner portions of each spoke pair being shaped to extend inwardly through a socket and to fit within a constricted channel, means to secure each spoke pair against axial and radial displacement, and resilient means in each socket yieldingly to resist distortion of each spoke pair.

4. A spring-spoke wheel hub structure including a skeleton hub comprising inner and peripheral cylindrical walls and radially disposed sets of walls extending from said inner to said peripheral wall to form spring-spoke sockets opening through the latter, said radial walls being dovetailed adjacent said peripheral wall, and spring-spokes having portions adapted to be seated in said sockets, and resilient means seated in the dovetailed sockets yieldingly to resist distortion of said seated spoke portions.

5. A spring-spoke wheel hub structure including a skeleton hub open at its sides and comprising inner and peripheral cylindrical walls and radially disposed sets of walls extending from said inner to said peripheral wall to form spring-spoke sockets opening through the latter, side plates adapted to be secured to said hub to close the open sides thereof, and means on the side plates to coact with said socket-forming walls to prevent radial or circumferential movement of said side plates with respect to said hub.

In witness whereof, I have hereunto set my hand this 23rd day of December, 1920.

ADELBERT F. KELLY.